(12) United States Patent
Donath et al.

(10) Patent No.: US 6,411,372 B1
(45) Date of Patent: Jun. 25, 2002

(54) GEODETIC INSTRUMENT WITH LASER ARRANGEMENT

(75) Inventors: Bernd Donath; Wieland Feist, both of Jena; Christian Graesser, Stadtroda; Ludwin-Heinz Monz, Ulm, all of (DE)

(73) Assignee: ZSP Geodaetische Systeme GmbH, Jena (DE)

(*) Notice: Subject to any disclaimer, the term of this patent is extended or adjusted under 35 U.S.C. 154(b) by 0 days.

(21) Appl. No.: 09/649,324

(22) Filed: Aug. 28, 2000

(30) Foreign Application Priority Data

Aug. 27, 1999 (DE) .......................... 199 41 638

(51) Int. Cl.$^7$ .................................. G01C 3/08
(52) U.S. Cl. ...................... 356/4.08; 356/4.01
(58) Field of Search .................. 356/3.01–515; 280/5.514; 73/1.81; 13/702; 410/13; 702/166; 404/84.5

(56) References Cited

U.S. PATENT DOCUMENTS

| | | | |
|---|---|---|---|
| 3,340,763 A | * 9/1967 | Power ........................ 88/1 |
| 4,856,894 A | 8/1989 | Anderson | |
| 4,869,590 A | * 9/1989 | Feist et al. ................ 356/148 |
| 4,988,192 A | 1/1991 | Knittel | |
| 5,159,760 A | 11/1992 | Spiegel et al. | |
| 5,519,489 A | * 5/1996 | McClenahan et al. . 356/139.09 |
| 5,589,927 A | * 12/1996 | Corghi ..................... 356/3.12 |
| 5,867,256 A | * 2/1999 | Van Rheeden ............ 356/4.03 |
| 5,949,548 A | * 9/1999 | Shirai et al. .............. 356/375 |
| 6,044,567 A | * 4/2000 | Feist ........................ 33/292 |
| 6,067,148 A | * 5/2000 | Kodaira et al. ........... 356/4.08 |
| 6,288,774 B1 | * 9/2001 | Takubo et al. ............ 356/4.03 |

FOREIGN PATENT DOCUMENTS

| | | |
|---|---|---|
| DE | 40 07 245 A1 | 9/1991 |
| DE | 199 41 638.9 | 12/2000 |
| JP | 4-198809 | 7/1992 |

OTHER PUBLICATIONS

*English Abstract of DE 40 07 245 A1.
*English Abstract of JP 4–198809.
*English Abstract of DE 199 41 638.9.

* cited by examiner

Primary Examiner—Thomas H. Tarcza
Assistant Examiner—Brian K Andrea
(74) Attorney, Agent, or Firm—Reed Smith LLP

(57) ABSTRACT

A geodetic instrument is disclosed which is set up over a ground point by a tripod and whose telescope is swivelable about a tilt axis and a rotational axis and which is outfitted with a laser arrangement for centering the rotational axis over the ground point and for determining the height h of the intersection point of the tilt axis and rotational axis over the ground point. In an instrument of the type mentioned above, a first, preferably collimated, laser beam extending in the rotational axis and at least one further laser beam path which extends divergent to the first laser beam are provided and, together, enclose an angle γ, and wherein there is further provided a measuring device for determining the distance a between the two laser beam paths at the height of the ground point and an evaluating device for calculating the height h of the intersection point over the ground point from the relationship h~a.

7 Claims, 4 Drawing Sheets

GEODETIC INSTRUMENT WITH LASER ARRANGEMENT

BACKGROUND OF THE INVENTION a) Field of the Invention

The invention is directed to a geodetic instrument with a telescope F whose sighting axis ZA has a common intersection point S with a tilt axis KA and a rotational axis DA about which the telescope F is swivelable and in which, further, a laser arrangement is provided which is used for aligning the rotational axis DA over the ground point and for determining the height h of the intersection point S over the ground point.

b) Description of the Related Art

Geodetic instruments of this type, e.g., theodolites or tachymeters, are known. They are used for land surveying based on determination of horizontal and vertical angles and, for this purpose, are generally set up by means of a tripod, e.g., over a boundary mark. In principle, they comprise an upper part which is swivelable about the vertically oriented rotational axis DA (often also called the vertical axis) and carries a telescope which can transit around the tilt axis KA with cross hair and distance adjustment in a sighting axis ZA which, like the rotation axis DA and the tilt axis KA, intersects the intersection point S.

For example, DE 38 38 512 describes a theolodite in which the carrying plate of the stand to which the theolodite is fitted has a cutout in its center through which a laser beam can be directed along the rotational axis to the ground point with which the theolodite is to be aligned. This provides an optical sighting device which facilitates setup and orientation.

However, this orientation of the device is not adequate for very precise measurements; rather, it is also necessary to know the height of the instrument, i.e., the height h of the intersecting point S of the sighting axis ZA, tilt axis KA and rotational axis DA over the ground point.

In this connection, DE 198 02 379 A1 discloses a surveying instrument with various accessories, including auxiliary means for determining the instrument height. For this purpose, a prism is to be placed on the ground point and an auxiliary mirror is swiveled in front of the telescope with a horizontally oriented sighting axis, so that the distance from the ground point can be measured with the electrooptical distance meter of the instrument and the instrument height can accordingly be determined.

Further, DE 40 07 245 A1 describes a "device for centering a geodetic instrument" over a defined ground point by means of an optical sighting device which is arranged centric to the vertical axis of the instrument. Again, as was mentioned above, this sighting device has means for generating a visible collimated laser beam bundle and means for projecting the bundle on to the ground point located in the extension of the vertical axis of the geodetic instrument. In this case, however, it is suggested that the laser beam bundle be utilized additionally for measuring the height between the ground point and the sighting axis.

The description of this device shows only that the laser beam bundle is modulated, the light reflected from the ground point is guided back to a reception device and the distance between the ground point and sighting axis is determined in an evaluating device following the reception device. The distance between the ground point and sighting axis is calculated from the reception signal. It is disadvantageous that distance measuring devices of this type are technically complicated and therefore cost-intensive.

OBJECT AND SUMMARY OF THE INVENTION

Proceeding from this prior art, it is the primary object of the invention to further develop a geodetic instrument of the type mentioned above in such a way that the centering of the device and the determination of the height of the intersecting point of sighting axis, swiveling axis and rotational axis over the ground point are ensured economically with respect to instrument technology, with high accuracy and favorable ergonomics.

According to the invention, a first, preferably collimated, laser beam extending in the rotational axis DA and at least one further laser beam path which is divergent relative to the first laser beam are provided and enclose an angle $\gamma$. Further, a measuring device for determining the distance a between the two laser beam paths at the height of the ground point and an evaluating device for calculating the height h of the intersection point S over the ground point from the relationship h~a at a known angle $\gamma$ are provided. The distance a is measured in the horizontal or at a right angle to the rotational axis DA.

This arrangement enables the determination of the distance between the ground point and the intersection point S on the basis of a measurement triangle which is formed by the first collimated laser beam, at least one further laser beam path enclosing a preferably constant angle $\gamma$ with the first laser beam, and the distance a. The relationship h~a corresponds to a basic trigonometric function.

The essential advantage of the invention consists in the possibility of relatively low expenditure on construction because fewer subassemblies are required than in a device outfitted with an optoelectronic distance measuring device according to the prior art.

An advantageous construction of the laser arrangement provides a housing which is arranged with its longitudinal axis radial to the rotational axis DA, a laser arranged in the housing, an objective which is likewise arranged in the housing for bundling the laser beam, and a deflecting element following the objective outside the housing for coupling the laser beam into the rotational axis DA; further, the laser arrangement according to the invention has optical means for generating the divergent laser beam path.

There are different possible variants for designing the optical means mentioned above. For example, they can be constructed such that a diffractive element with an optically active structure is disposed in the first laser beam so that a proportion of this radiation is transformed into a circular diffraction pattern oriented concentric to the rotational axis DA and this circular diffraction pattern is directed divergently onto the ground point or its neighborhood.

The diffractive element is arranged in front of or behind the deflecting element in the beam path and comprises a transparent plate which is provided with a pattern hologram. The pattern hologram is formed of geometric figures which are preferably formed from points arrayed in a circular shape, line shape and/or over a surface area. The figures are arranged centric to the laser beam and have a brightness maximum in their center.

This brightness maximum can be formed by a centrally situated surface area portion with the highest possible transparency or also by a central cutout in the transparent plate.

As an alternative to the construction variant mentioned above, at least one additional laser light source can be provided for generating the divergent laser beam path; this additional laser light source radiates into the objective at an angle $\alpha \neq 0°$ and is imaged through the objective onto the ground point or its neighborhood, wherein the beam path directed to the ground point encloses with the first laser beam the divergence angle γ which is proportional to the incident angle α.

In this respect, a particularly preferable construction of the invention consists in that a first laser diode is arranged in such a way that the radiation proceeding from it is radiated into the objective in the direction of the optical axis, i.e., at an angle α=0°, wherein the light emitted by it is used to generate the first laser beam and accordingly serves primarily for centering the geodetic device.

In addition to this first laser diode, two additional laser diodes are provided, each of which radiates into the objective at an angle α≠0°, preferably where α≠0°.

The two laser diodes radiating into the objective at an angle α≠0° generate two laser beams, each of which encloses a divergence angle γ with the first laser beam. In this way it is achieved that each of the three laser light sources is imaged on the ground point or in its immediate neighborhood, wherein the three laser diodes are so arranged in relation to the objective that their three images lie on a straight line. The center image is used for centering and the distances a between the two outer images and the center image at a known angle γ is a measure for the height h of the intersection point S above the ground point.

Addition constants which are given, for example, by the difference in height caused by technical factors relating to the instrument between the vertex of the divergent beam paths and the intersection point S can, of course, be included in the determination of this height h.

Alternatively, a scale which is constructed for visually reading the distance a or sum 2a and which is provided with a bar code or bar marking calibrated in a unit of length or a position-sensitive optoelectronic detector followed by an evaluating and display device can be provided as measuring device.

The distance a can be determined in a simple manner with the scale by placing it on the ground point in such a way that the first laser beam or the image of the first radiation source is directed to the bar marking and then, by means of the bar marking, reading off the diameter d=2a of the circular diffraction pattern or the distance a of the images of the second and first radiation source from the image of the first radiation source.

A particularly advantageous construction of the invention is provided in that (at a constant angle γ) the bar marking is calibrated in a manner deviating from the metric unit such that an amount for height h can be read off directly.

CCD lines or CCD arrays, for example, can be provided as position-sensitive detectors. The maximum distance between two radiation sources imaged on the array or on the CCD line is an equivalent for the height h, wherein it is likewise a prerequisite in this case that the three images lie on a straight line.

A value for the height h can be obtained in signal processing means, known per se, from the maximum distance 2a between the two outer images on the detector and is shown on a display. A CCD line and a display can advantageously be accommodated on a compact unit, for example, in the form of a flat measurement instrument.

In order to determine the height h, it is then only necessary to place this flat measurement instrument on the ground point and to ensure that the first laser beam impinges on the CCD line and that the two outer beam paths are imaged on the CCD line, whereupon a value for height h can be read directly from the display.

For the sake of completeness, it is noted that the radiation sources and the laser diodes emit a radiation in the visible wavelength range of light with an intensity which can be detected very well also when daylight is superimposed.

The invention will be described more fully in the following with reference to an embodiment example.

DESCRIPTION OF THE PREFERRED EMBODIMENTS

Figure 1:
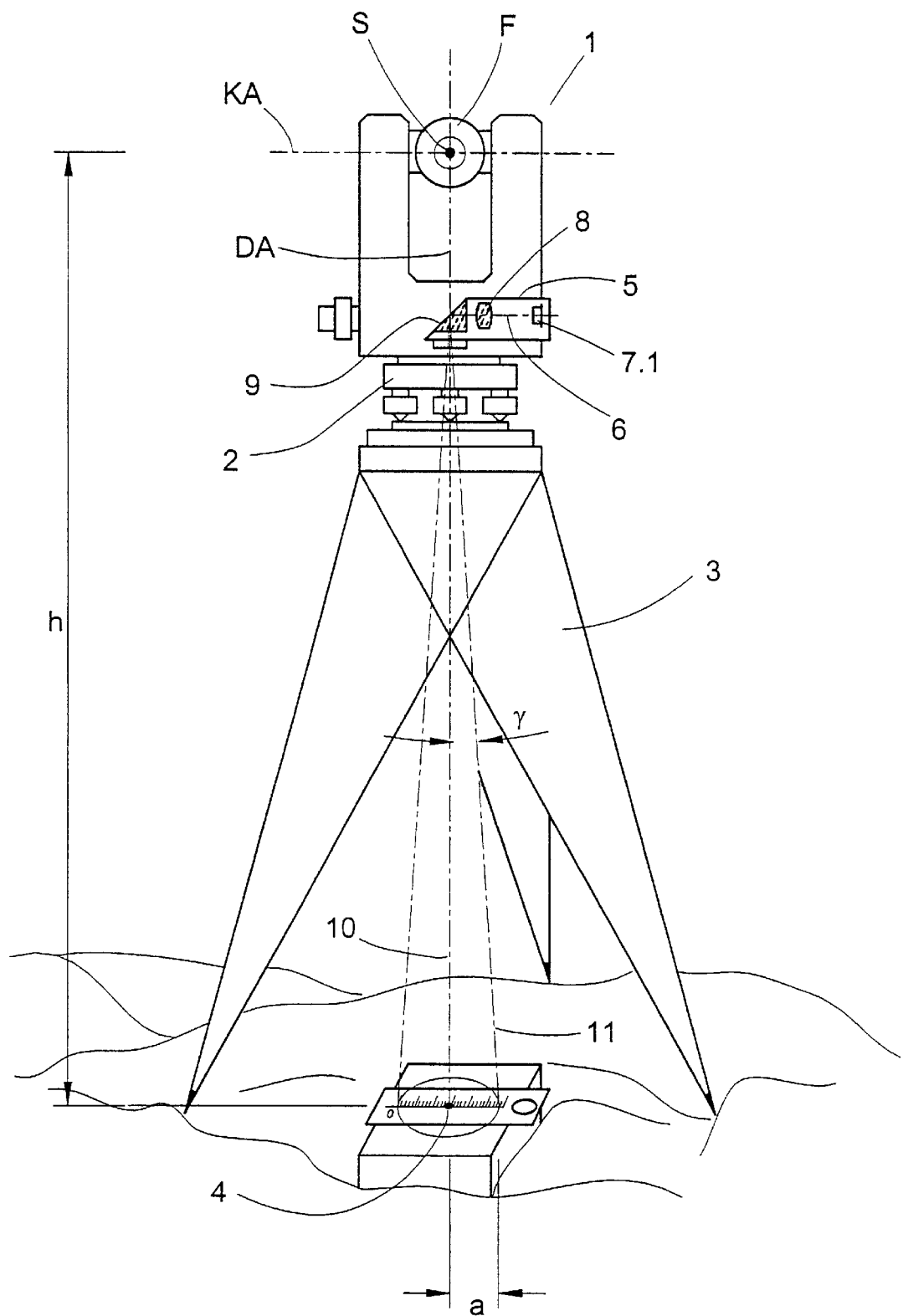
FIG. 1 shows an overall schematic view of the geodetic instrument.

In FIG. 1, a geodetic instrument 1 with a tribrach 2 is set on a tripod 3 and centered over a ground point 4.

The geodetic instrument 1, for example, a theolodite, has a telescope F that is swivelable about a tilt axis KA and about a rotational axis DA. The tilt axis KA and the rotational axis DA both intersect the sighting axis ZA of the telescope F at an intersection point S; the telescope F extends vertical to the drawing plane in FIG. 1 so that only one point is shown.

For accurate measurements to be carried out over the sighting axis ZA, an exact adjustment of the instrument 1 over the ground point 4 is required. The instrument 1 is adjusted when the tilt axis KA is oriented horizontal to the ground point 4 and the rotational axis DA is oriented vertical to the ground point 4.

Adjusting means are, for example, a bubble level (not shown) arranged at the instrument 1 and a laser arrangement which substantially comprises a housing 5 which is arranged with its longitudinal axis 6 radial to the rotational axis DA, at least one laser radiation source, for example, a laser diode 7.1 emitting in the visible wavelength range, an objective 8 through which the laser radiation is bundled and directed to a deflecting element 9 which provides for the deflection of the laser beam 10 from the longitudinal axis 6 into the rotational axis DA.

In surveying, it is often also necessary to take into account the height h of the intersection point S above the ground point 4; that is, this height h must be determined as economically as possible after the instrument 1 has been successfully aligned over the ground point 4.

For this purpose, another laser beam path 11 extending at an angle γ divergently with respect to laser beam 10 is provided according to the invention. The divergence angle γ is constant, so that the laser beam 10, the beam path 11 and the distance a between the two laser beam paths 10, 11 at the height of the ground point 4 form a measurement triangle from which the height h can easily be determined as will be shown.

Figure 2:
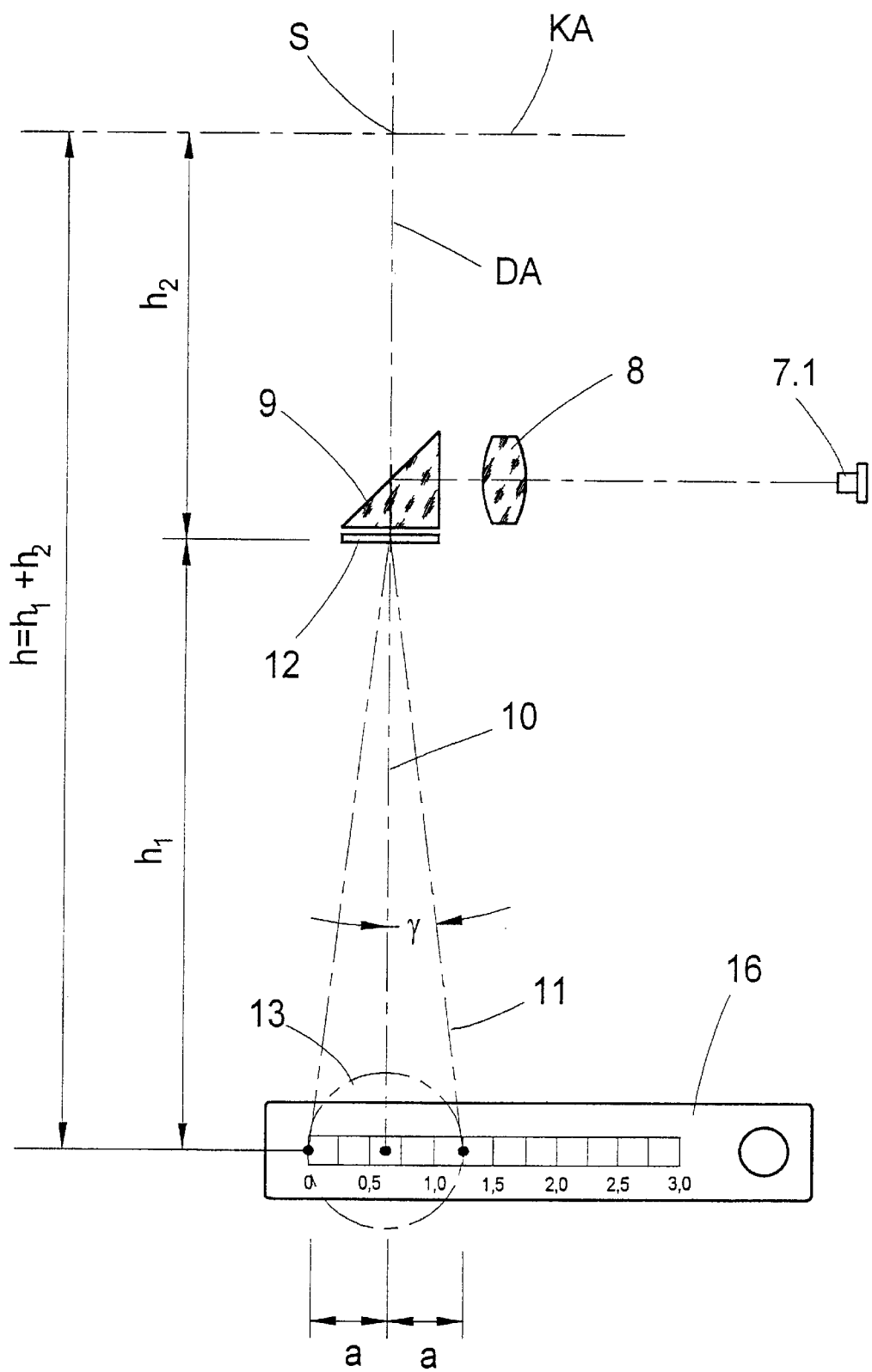
FIG. 2 is a first variant of the measurement principle for determining the height h.

In a first construction variant shown in FIG. 2, the beam path 11 is generated by means of a diffractive element 12. The diffractive element 12 has an optically active structure through which a proportion of the laser beam 10 is transformed into a circular diffraction pattern 13 pattern which is oriented concentric to the rotational axis DA and directed divergently onto the ground point 4 or its neighborhood.

This effect of the diffractive element 12 is achieved, for example, when the diffractive element is made from a transparent plate, preferably from a glass plate, and is provided with diffraction figures formed, for example, by a plurality of points arranged on concentric circles. In their center, these figures have a region of high transparency, so that the laser beam 10 can pass through with the least possible obstruction. For this purpose, the diffractive element 12 can have a cutout in its center through which the laser beam 10 can pass unobstructed.

When the distance a between laser beam 10 and laser beam 11 or the diameter d=2a of the great circle of the diffraction pattern 13 is determined at the height level of the ground point 4, as will be described in the following, the height $h_1$, which is proportional to the distance a or the diameter d=2a, can be determined from this (see FIG. 2). When height $h_2$ which corresponds to the distance between the diffractive element and the intersection point S is added to height $h_1$, this gives the height h of the intersection point S over the ground point 4.

Figure 3:
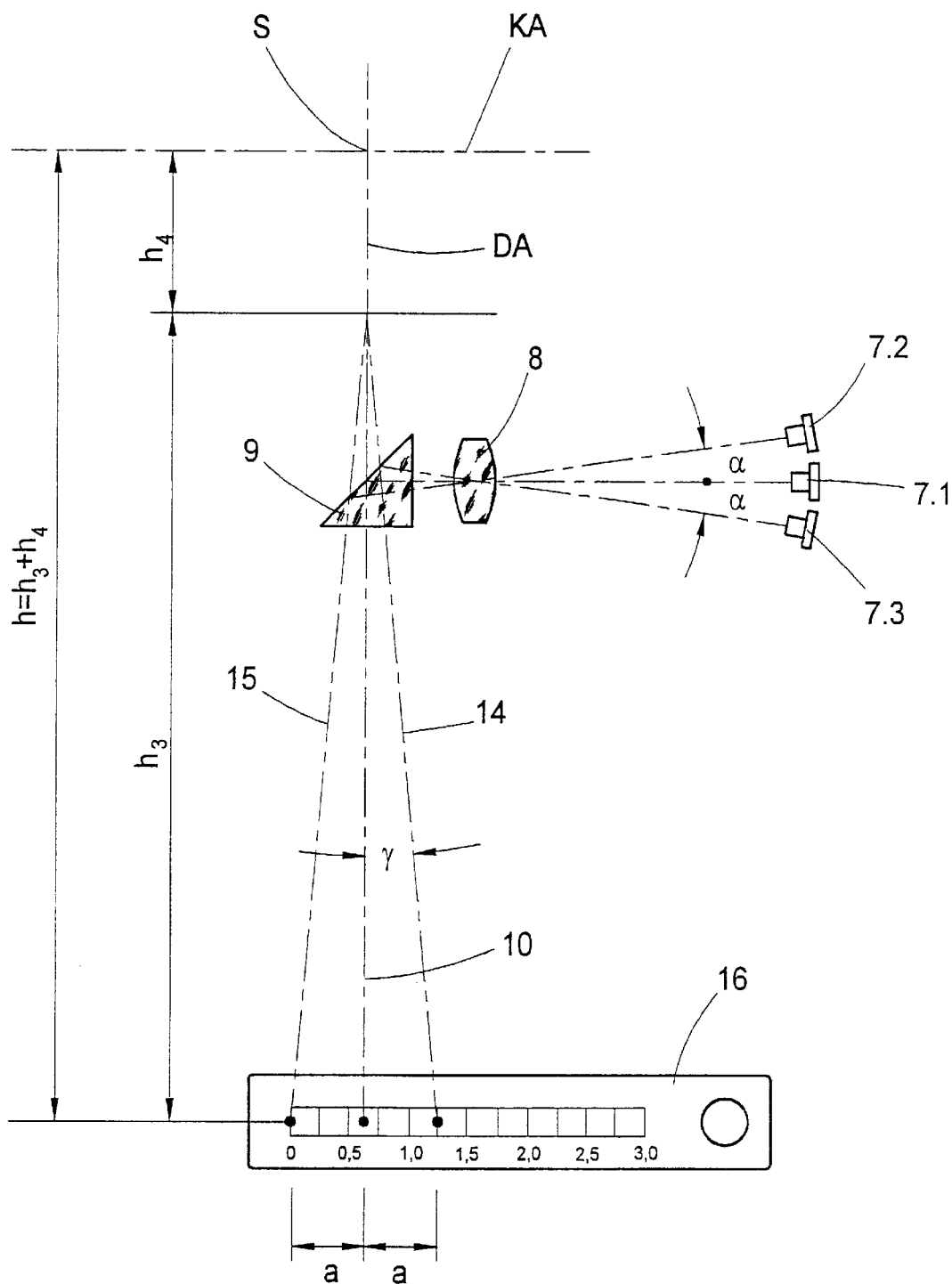
FIG. 3 is a second variant of the measurement principle for determining height h.

In a second construction variant of the invention which is indicated by way of example in FIG. 3, two additional laser diodes 7.2 and 7.3 are arranged next to laser diode 7.1, namely, in such a way that they radiate into the objective 8 at an angle $\alpha \neq 0°$, preferably $\alpha=10°$. The objective 8 then images the three laser diodes 7.1, 7.2 and 7.3 via separate collimated beam paths 14 and 15 onto the ground point 4 and its neighborhood.

In a manner analogous to the embodiment example according to FIG. 2, the distance a between the laser beam 10 and one of the beam paths 14, 15 at the height level of the ground point 4 is a measure for the height $h_3$ corresponding to the distance between the vertex of the divergence angle γ and the ground point 4. When height $h_4$ which, for technical reasons relating to the instrument, is fixed as the distance between the vertex of the divergence angle γ and the intersection point S is added to height $h_3$, height h gives the distance of the intersection point S over the ground point 4.

Figure 4:
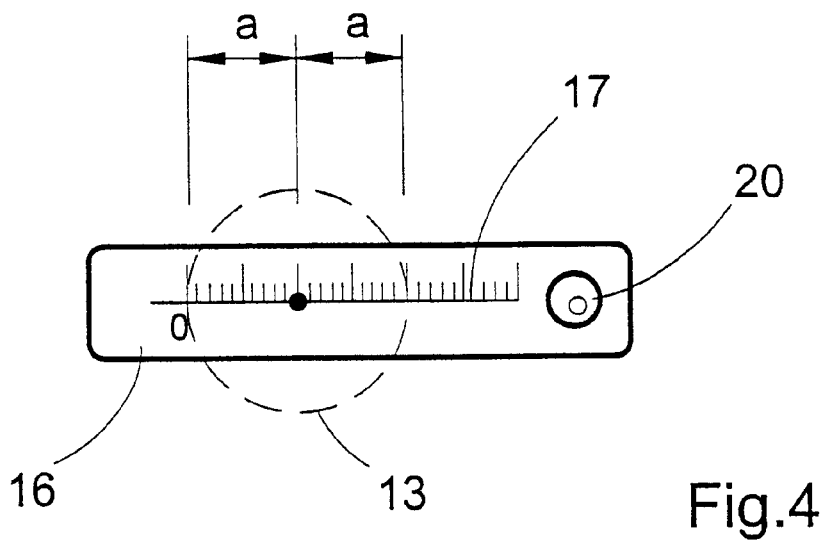
FIG. 4 illustrates an example for a reading scale.

A scale 16, shown by way of example in FIG. 4, which is provided with bar marks 17 calibrated in a unit of length can be provided as auxiliary means for determining the distances a or the diameter d=2a. This length unit can be metrically defined so that a reading in mm is possible. In a particularly preferred construction, the calibration can also be carried out in such a way that an amount corresponding to height h can be read off immediately.

However, the use of a position-sensitive optoelectronic detector followed by an evaluating and display device is very advantageous and is therefore recommended. As is shown in FIG. 5, this evaluating and display device can be accommodated along with a CCD line 18 in a flat measurement instrument which is positioned on the ground point 4 in such a way that the images of all three laser diodes 7.1, 7.2 and 7.3 lie on the CCD line 18.

The evaluating circuit determines the height h from the distances a by evaluating the relationships described above and shows this height h on an integrated display 19. The height h can be read off directly and taken into account in the measurements to be carried out subsequently.

Figure 5:
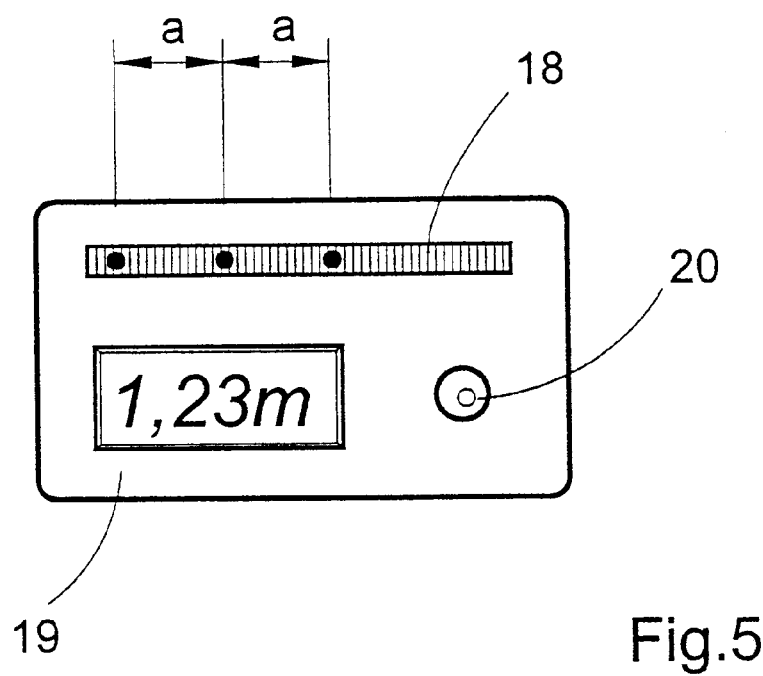
FIG. 5 is an example for a measuring and display instrument with CCD line.

Another construction can consist in that the value (height h) determined by the measurement instrument shown in FIG. 5 is stored and fed to the computer for further use, wherein the computer processes all measurement values determined with the device 1 to obtain the desired measurement results.

A circular level 20 can be provided for example (see FIG. 4 and FIG. 5) for horizontal alignment of the scale 16 and measurement device according to FIG. 5, so that the distance a is measured at a right angle to the rotational axis DA.

While the foregoing description and drawings represent the preferred embodiments of the present invention, it will be obvious to one skilled in the art that various changes and modifications may be made therein without departing from the true spirit and scope of the present invention.

REFERENCE NUMBERS 1 geodetic instrument
2 tribrach
3 tripod
4 ground point
5 housing
6 axis
7.1, 7.2, 7.3 laser diodes
8 objective
9 deflecting element
10 first laser beam
11 second laser beam path
12 diffractive element
13 diffraction pattern
14, 15 beam paths
16 scale
17 bar marking
18 CCD line
19 display

What is claimed is:
1. A geodetic instrument comprising:
  a telescope having a sighting axis which has a common intersection point with a tilt axis and a rotational axis about which the telescope is swivelable;
  a laser arrangement being provided which is used for aligning the rotational axis over a ground point and for determining the height h of the intersection point over the ground point;
  a first, collimated, laser beam extending in the rotational axis being directed to the ground point;
  at least one further laser beam path which extends divergent to the first laser beam being provided and enclosing an angle γ with the first laser beam;
  a measuring device for determining the distance a between the divergent laser beam path at the height of the ground point and the first laser beam;
  an evaluating device for calculating the height from the relationship between h and a at a known angle γ; and
  the laser arrangement has a housing which is arranged with its longitudinal axis radial to the rotational axis, a laser radiation source arranged in the housing, an objective which is likewise arranged in the housing for bundling the laser radiation, and a deflecting element following the objective for coupling the laser beam into the rotational axis, and is further outfitted with optical means for generating the divergent second laser beam path.

2. The geodetic instrument according to claim 1, wherein a diffractive element with an optically active structure is disposed in the laser beam path so that a proportion of the laser beam extending in the rotational axis is transformed into a circular diffraction pattern which is oriented concentric to the rotational axis and is directed divergently onto the ground point or its neighborhood.

3. The geodetic instrument according to claim 2, wherein the diffractive element is arranged following the deflecting element.

4. The geodetic instrument according to claim 2, wherein the diffractive element comprises a transparent plate with a pattern hologram formed of geometric figures, formed from concentric circles of points, lines of points and/or areas of points, wherein the figures are positioned centric to the laser beam and have a brightness maximum in their center.

5. The geodetic instrument according to claim 1, wherein at least one additional laser light source is provided which radiates into the objective at an angle a 0° and is imaged onto the ground point or its neighborhood, wherein its beam path encloses a divergence angle γ~a with the first laser beam.

6. The geodetic instrument according to claim 1, wherein a scale which is constructed for visually reading the distance a and is provided with bar marks calibrated in a unit of length and/or a position-sensitive optoelectronic detector followed by an evaluating and display device are/is provided as measuring device.

7. The geodetic instrument according to claim 1, wherein laser diodes with radiation in the visible wavelength range of light are provided as radiation sources.

* * * * *